UNITED STATES PATENT OFFICE.

ALVAH W. ESTABROOK, OF KANSAS CITY, MISSOURI, AND HARRY E. WEAVER, OF KANSAS CITY, KANSAS, ASSIGNORS TO THE LARABEE FLOUR MILLS COMPANY, OF HUTCHINSON, KANSAS, A CORPORATION OF KANSAS.

DRY SHORTENING COMPOSITION.

1,101,015.     Specification of Letters Patent.    Patented June 23, 1914.

No Drawing.     Application filed June 14, 1913. Serial No. 773,730.

*To all whom it may concern:*

Be it known that we, ALVAH W. ESTABROOK and HARRY E. WEAVER, citizens of the United States, residing, respectively, at Kansas City, in the counties of Jackson and Wyandotte and States of Missouri and Kansas, have invented certain new and useful Improvements in Dry Shortening Compositions, of which the following is a specification.

Our invention relates to a dry-shortening flour, and to the composition used to produce the same.

One object of the invention is to provide a composition for mixing in the dry state with flour whereby, when the flour is moistened and subjected to the action of heat, it will be shortened by a liberated constituent of said composition, thus rendering the flour self shortening, and dispensing with the necessity of mixing lard, butter, or other basic fats with the flour for shortening purposes.

Another object of the invention is to produce a composition of the character indicated which, either by itself or when combined with the flour, may be kept for an indefinite period without material deterioration, or without becoming rancid.

A still further object is to produce a dry or self-shortening flour, which will have the appearance and characteristics of ordinary flour; which may be kept for a long period of time without any substantial change in its quality or characteristics; which will be unaffected by climatic conditions or ordinary changes in temperatures; and which, when moistened by water, milk, or the like, and baked, will be effectively and properly shortened without the addition of other material.

In carrying out our invention, we take a fatty substance, such for instance, as stearin, stearic acid, oleo stearin, oleic acid, or palmitic acid, and chemically combine therewith in proper proportions a substance having an alkaline reaction, such, for instance, as sodium bicarbonate, sodium carbonate, potassium carbonate, sodium hydroxid, or potassium hydroxid. The fatty substance and the substance having an alkaline reaction are chemically combined by placing them in a suitable vessel and subjecting them to heat until the reaction is completed, the resultant product being a stearate, palmitate, or oleate, as the case may be, it depending on the ingredients employed. The chemical union of the two substances may be materially hastened by adding about one percentum of water during the heating process.

The substance having the alkaline reaction when combined with the fatty substance as described, forms a product which may be kept without material deterioration for a long period of time. Said product, on becoming cool, is reduced to powdered form and the composition is then completed by intermixing with said product a substance having an acid reaction, such, for instance, as calcium acid phosphate, to free the fatty substance during the process of baking, so that said fatty substance may carry out its shortening function.

As illustrations of other substances having an acid reaction which could be used in lieu of the calcium acid phosphate, we would mention among the salts, acid calcium phosphate; acid calcium lactate; and potassium bi-tartrate; and among the acids, citric acid and tartaric acid. These, with the calcium acid phosphate, constitute all of the substances having an acid reaction which now occur to us as being suitable for the purposes of this invention. We wish it to be understood, however, that the above list is not necessarily an exhaustive one, and we claim, as coming within the scope of our invention, the use of any powdered substance having an acid reaction which is suitable for the purposes of the invention: that is, which is edible and which will combine with the base of the salt of the fatty acid employed.

The proportions entering into the composition vary according to the ingredients employed, hence we do not wish to be restricted to any particular proportions. However, when we employ, for example, stearic acid, sodium bicarbonate, and calcium acid phosphate to produce the composition, we mix them in approximately the following proportions:

| | |
|---|---|
| Stearic acid | 10 lbs. |
| Sodium bicarbonate | 3 " |
| Calcium acid phosphate | 2½ " |

The ingredients treated and mixed as specified, are sufficient for treating about 200 pounds of flour.

When the composition is to be employed for baking purposes it is mixed with a cereal product, such for instance, as flour, and a suitable liquid as water, is added, when the whole is kneaded into dough and left in an oven until baked. The action of the heat and moisture during the baking process, causes the calcium acid phosphate to chemically react with the sodium stearate formed by the union of the stearic acid and the sodium bicarbonate, and free the stearic acid, so that it may perform its function of shortening the dough.

Our composition, when mixed with flour in a dry state, will remain chemically and physically separate therefrom; that is to say, it will not modify, or itself be modified by, the flour. Hence the composition may be mixed on a large scale with flour, and the flour be packed or barreled for commercial purposes.

Having thus described our invention, what we claim and desire to secure by Letters Patent is:

1. A dry-shortening flour containing a salt of a fatty acid and a powdered, edible substance having an acid reaction and capable of combining with the base of said salt of a fatty acid, the proportion of the salt of the fatty acid being such that the fatty acid thereof will act to shorten the product when set free by the action of the acid substance upon its combining base.

2. A dry-shortening flour containing a salt of a fatty acid and a powdered, edible salt having an acid reaction and capable of combining with the base of said salt of a fatty acid, the proportion of the salt of the fatty acid being such that the fatty acid thereof will act to shorten the product when set free by the action of the acid salt upon its combining base.

3. The herein described product consisting of flour having mixed therewith in the dry state a powdered salt of a fatty acid and a powdered, edible salt having an acid reaction, and capable of combining with the base of said salt of a fatty acid, the proportion of the salt of the fatty acid being such that the fatty acid thereof will act to shorten the product when set free by the action of the acid salt upon its combining base.

4. The herein described product consisting of flour having mixed therewith in the dry state a powdered stearate and a powdered, edible substance having an acid reaction and capable of combining with the base of the stearate, the proportion of the stearate being such that the stearic acid thereof will act to shorten the product when set free by the action of the acid substance upon its combining base.

5. The herein described product consisting of flour having mixed therewith in the dry state a powdered stearate and a powdered, edible salt having an acid reaction and capable of combining with the base of the stearate, the proportion of the stearate being such that the stearic acid thereof will act to shorten the product when set free by the action of the acid salt upon its combining base.

6. The herein described product consisting of flour having mixed therewith in the dry state powdered sodium stearate and a powdered, edible substance having an acid reaction and capable of combining with the base of the stearate, the proportion of the sodium stearate being such that the stearic acid thereof will act to shorten the product when set free by the action of the acid substance upon its combining base.

7. The herein described product consisting of flour having mixed therewith in the dry state powdered sodium stearate and powdered calcium acid phosphate, the proportion of sodium stearate being such that the stearic acid thereof will act to shorten the product when set free by the action of the acid phosphate upon its combining base.

8. The herein described product comprising a salt of a fatty acid and a powdered edible substance having an acid reaction and capable of combining with the base of said salt to set free the fatty acid thereof, the substances being mixed in proportions to yield a shortening amount of the fatty acid under reaction.

9. The herein described product comprising a salt of a fatty acid and a powdered edible salt having an acid reaction and capable of combining with the base of said salt of a fatty acid to set free the fatty acid thereof, the substances being mixed in proportions to yield a shortening amount of the fatty acid under reaction.

10. The herein described product comprising a powdered stearate and a powdered edible substance having an acid reaction and capable of combining with the base of said stearate to set free the stearic acid thereof, the substances being mixed in proportions to yield a shortening amount of setaric acid under reaction.

11. The herein described product comprising powdered sodium stearate and powdered calcium acid phosphate, the substances being mixed in proportions to yield a shortening amount of stearic acid under reaction of the acid phosphate with the base of said stearate.

12. A dry shortening flour containing a salt of a fatty acid and calcium acid phosphate, the proportion of the salt of the fatty acid being such that the fatty acid thereof will act to shorten the product when set free by the action of the calcium acid phosphate upon its combining base.

In testimony whereof we affix our signatures, in the presence of two witnesses.

ALVAH W. ESTABROOK.
HARRY E. WEAVER.

Witnesses:
F. G. FISCHER,
L. J. FISCHER.